United States Patent [19]

Matsushima

[11] Patent Number: 5,145,146
[45] Date of Patent: Sep. 8, 1992

[54] NOZZLE SUPPORT ARRANGEMENT IN ELECTROMAGNETIC VALVE

[75] Inventor: Tetsuhiko Matsushima, Shizuoka, Japan

[73] Assignee: Yazaki Corporation, Japan

[21] Appl. No.: 807,594

[22] Filed: Dec. 16, 1991

[30] Foreign Application Priority Data

Apr. 15, 1991 [JP] Japan .................. 3-25057[U]
Jul. 4, 1991 [JP] Japan .................. 3-51814[U]

[51] Int. Cl.⁵ ........................................ F16K 31/06
[52] U.S. Cl. .................... 251/129.02; 251/363; 251/129.19; 137/550
[58] Field of Search .............. 251/129.01, 144, 363, 251/362, 129.19; 137/550

[56] References Cited

U.S. PATENT DOCUMENTS 2,166,484  7/1939  Carlson .................. 251/129.02 X

FOREIGN PATENT DOCUMENTS

64-6580  1/1989  Japan .
64-6581  1/1989  Japan .
64-6582  1/1989  Japan .
64-6583  1/1989  Japan .
64-6584  1/1989  Japan .
64-6586  1/1989  Japan .

*Primary Examiner*—Arnold Rosenthal
*Attorney, Agent, or Firm*—Wigman & Cohen

[57] ABSTRACT

A nozzle support arrangement in an electromagnetic valve includes a frame, a solenoid fixedly mounted on the outside of the frame, a valve element arranged on the inside of the frame and driven in advancement and retreatment by the solenoid, a nozzle arranged on the inside of the frame and arranged so as to be opposed to the valve element, and support member by which the nozzle is supported on the inside of the frame. The support member includes a plurality of spacer sections fixedly mounted in an upstanding manner on the inside of the frame, and a plurality of latching sections arranged respectively at forward ends of the respective spacer sections and rotatably latching the nozzle.

6 Claims, 8 Drawing Sheets

NOZZLE SUPPORT ARRANGEMENT IN ELECTROMAGNETIC VALVE

BACKGROUND OF THE INVENTION

The present invention relates to a nozzle support arrangement for an electromagnetic valve.

Figure 1:
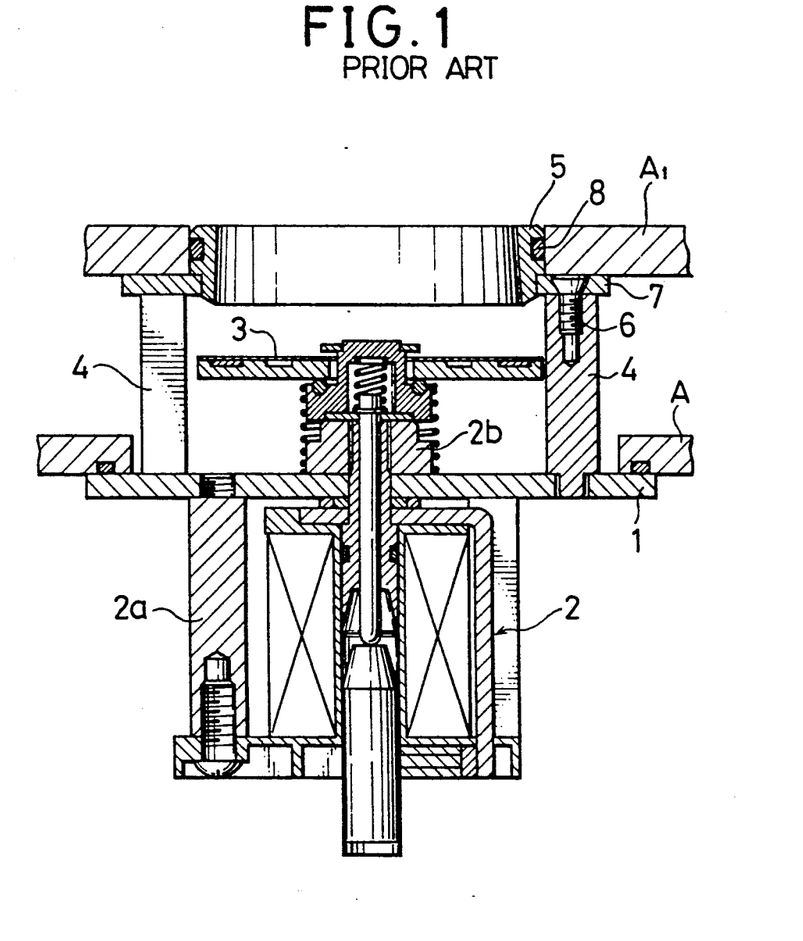
Figure 2:
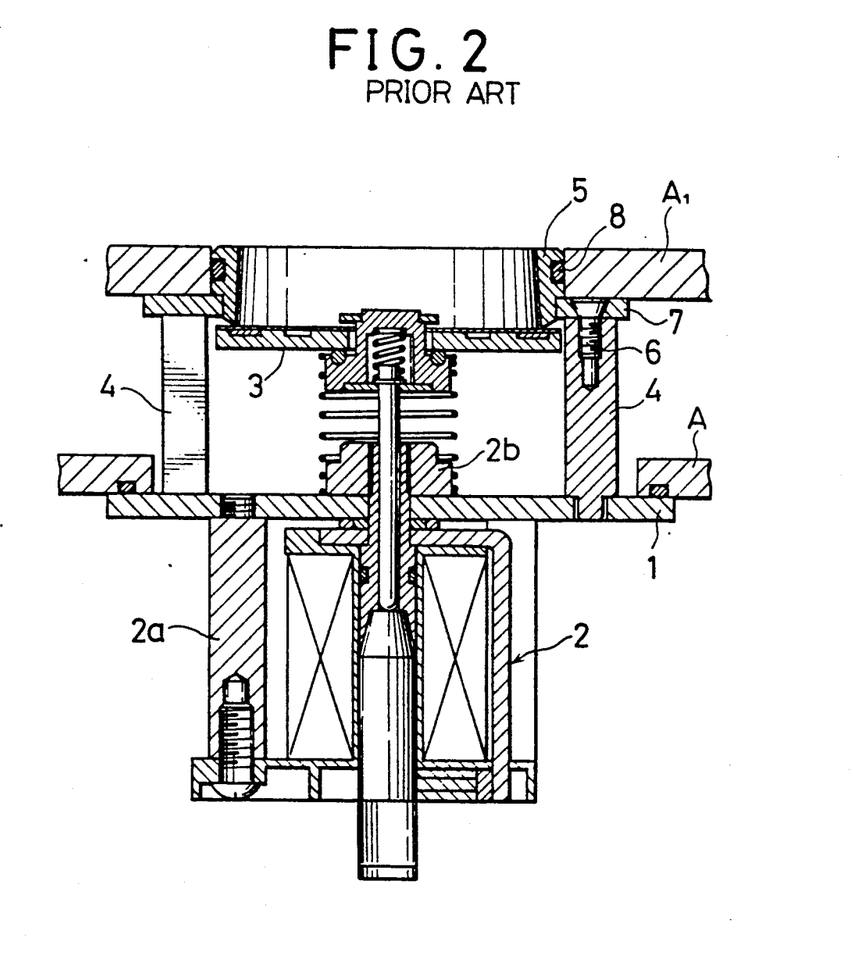

A gas cut-off valve, which is incorporated in a security gas meter or the like, is united or is brought to a unit. Conventionally, as shown in FIGS. 1 and 2 of the drawings attached hereto, the gas cut-off valve has includes a frame 1 mounted on the outside of a valve housing A formed on the gas meter, a solenoid 2 mounted on the outside of the frame 1 through two (2) fixing posts 2a (only one shown in FIGS. 1 and 2) and having a center fixedly screwed by a nut 2b located on the inside of the frame 1, a valve element 3 located on the inside of the frame 1 and associated with the solenoid 2, and a nozzle 5 fixedly mounted through three (3) spacers 4 (only two (2) shown in FIGS. 1 and 2) projecting on the inside of the frame 1 and opposed to the valve element 3.

With the above arrangement, assembling is completed only by the fact that functional elements forming a principal portion of the valve arrangement are fixedly mounted on the inside and outside surfaces of the frame 1. Driving regulation or adjustment can be made at this time. Further, an outer peripheral section of the nozzle 5 is fitted in a partition wall A1 partitioning a gas upstream section and a gas downstream section formed within the housing A under such a condition that the frame 1 is fixedly mounted on the outside section of the housing A. Thus, the cut-off valve arrangement is completed.

Furthermore, the nozzle 5 is fixedly fitted in an inner periphery of an annular mounting element 7 which is fixedly mounted on upper ends of the respective spacers 4 by screws 6. Moreover, an O-ring 8 is mounted on the outer periphery of the nozzle 5, to retain gas-tightness between the partition wall A1 and the nozzle 5.

In the arrangement described above, however, there is a fear that, since the nozzle 5 is fixedly mounted on the frame 1 through the mounting element 7 and the spacers 4, a compressive load acts upon the O-ring 8 when the nozzle 5 is mounted on the fitting bore in the partition wall A1, while a radial load acts upon the O-ring 8 because the nozzle 5 is mounted while being rotated peripherally. For this reason, there is such a possibility that the O-ring 8 is broken, and stress is left so that the service life is shortened.

Further, the following disadvantages occur. That is, since the nozzle 5 is fixedly screwed onto the three (3) spacers 4 through the mounting element 7, assembling is troublesome. There is a case where the nozzle 5 is fixedly mounted under an inclined condition with respect to the valve element 3 due to dimensional errors of the length of each of the spacers 4 and assembling errors. Thus, variation is liable to occur in operation. Furthermore, since assembling is made by the use of screws, there is a limit in miniaturization.

SUMMARY OF THE INVENTION

It is therefore a first object of the invention to provide a nozzle support arrangement in an electromagnetic valve, which is capable of preventing damages and stress and strain of an O-ring for gas-tight sealing from occurring when a nozzle is mounted on a valve housing, and capable of improving characteristic of the O-ring.

It is a second object of the invention to provide a nozzle support arrangement in an electromagnetic valve, which is capable of simplifying support means of a nozzle, capable of highly increasing an accuracy of the support means, and capable of miniaturizing the support means.

According to the invention, there is provided a nozzle support arrangement in an electromagnetic valve, comprising:
a frame;
a solenoid fixedly mounted on the outside of the frame;
a valve element arranged on the inside of the frame, and driven in advancement and retreat by the solenoid;
a nozzle arranged on the inside of the frame and arranged so as to be opposed to the valve element; and
support means by which the nozzle is supported on the inside of the frame, the support means including a plurality of spacer sections fixedly mounted in an upstanding manner on the inside of the frame, and a plurality of latching sections arranged respectively at forward ends of the respective spacer sections and rotatably latching the nozzle.

Further, in a preferred embodiment, a nozzle support arrangement in an electromagnetic valve is characterized in that a lower support annulus is integrally provided which connects the plurality of spacer sections to each other, and the lower support annulus is fixedly mounted on the inside of the frame.

With the arrangement of the invention, the nozzle is rotatably engaged with one ends of the respective spacer sections whose other ends are fixedly connected to the frame. Accordingly, even if two (2) forces in compressive and radial directions are applied to an O-ring serving as gas-tight sealing means which is mounted on the outer periphery of the nozzle when the nozzle is mounted on the frame, the force in the radial direction does not substantially acts upon the nozzle because the nozzle is rotatable with respect to the frame. Accordingly, it is possible to prevent damages and stress and strain from occurring in the O-ring. Further, since the plurality of spacer sections extend integrally from the support annulus which is fixedly mounted on the inside of the frame, dimensional errors and mounting errors do not occur. Furthermore, the nozzle is easy to be fixed to the support member.

BRIEF DESCRIPTION OF THE DRAWINGS

FIGS. 1 and 2 are cross-sectional views for explanation of a nozzle support arrangement in a conventional electromagnetic valve, FIG. 1 showing a condition under which the valve is open, while FIG. 2 shows a condition under which the valve is closed;

FIGS. 3 and 4 are cross-sectional views for explanation of a nozzle support arrangement in an electromagnetic valve, according to an embodiment of the invention, FIG. 3 showing a condition under which the valve is open, while FIG. 4 shows a condition under which the valve is closed;

FIGS. 7 and 8 are cross-sectional views for explanation of a nozzle support arrangement in an electromagnetic valve, according to a second embodiment of the invention, FIG. 7 showing a condition under which the valve is open, while FIG. 8 shows a condition under which the valve is close;

DESCRIPTION OF THE EMBODIMENTS

Various embodiments of the invention will be described below in detail with reference to the drawings.

Referring first to FIGS. 3 through 6, there is shown an electromagnetic valve according to a first embodiment of the invention.

In this connection, the detailed description of a valve arrangement will be omitted, but an arrangement similar to or different from the conventional arrangement illustrated in FIGS. 1 and 2 can be employed.

As shown in FIGS. 3 through 6, a solenoid 22 is fixedly mounted on the outside of a frame 20 through a pair of mounting posts 21. An anvil 23 projects from a center of the solenoid 22. A nut element 23a is threadedly engaged with an outer periphery of an inward end of the anvil 23 which projects toward the frame 20, whereby the solenoid 22 is fixedly mounted on the frame 20.

Figure 3:
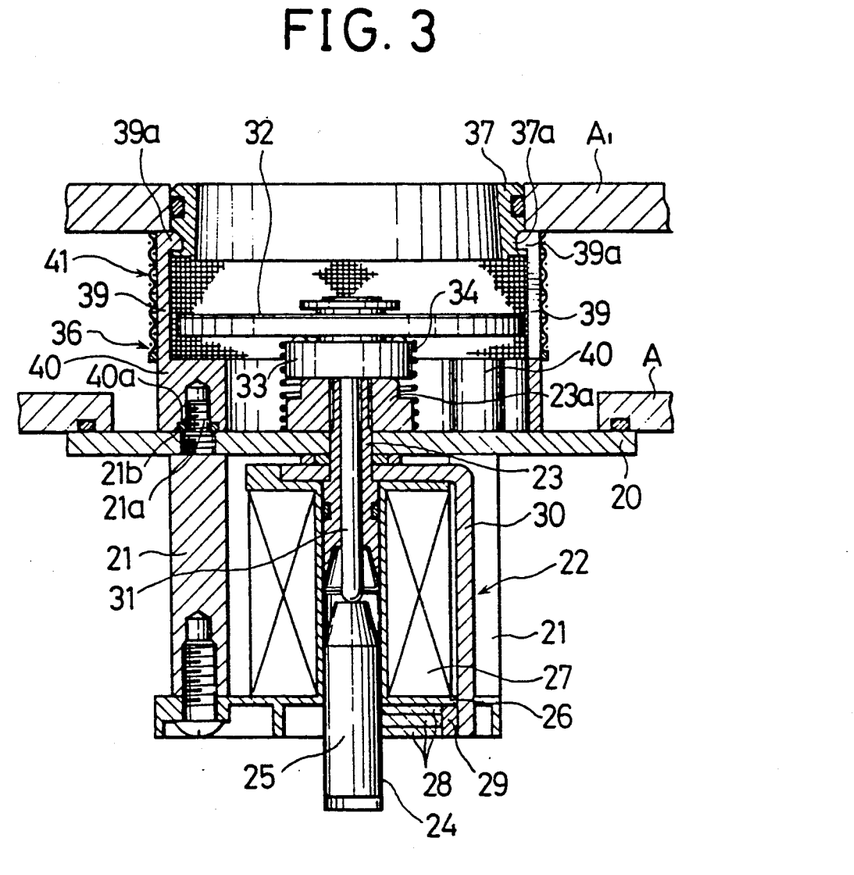
Figure 4:
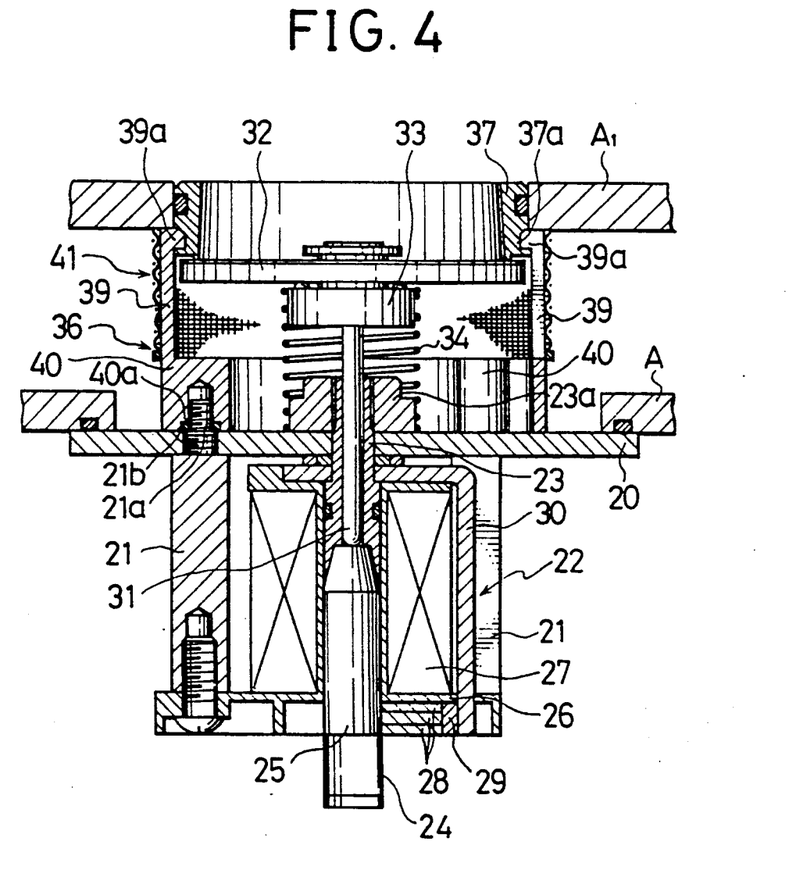

The solenoid 22 includes a thin-wall metal sleeve 24 having a forward end in a center of which the anvil 23 is inserted, a plunger 25 arranged behind the anvil 23 and slidably inserted in the sleeve 24, a bobbin 26 in a center of which the sleeve 24 is fixedly fitted, a coil 27 wound about an outer periphery of the bobbin 26, a magnet 29 fixedly mounted on a flange surface of a lower end of the bobbin 26 through a plurality of spacers 28, and an L-shaped yoke 30 arranged at an outer periphery of the coil 27 and having one end thereof connected to the magnet 29. The other end of the L-shaped yoke 30 is fitted about an outer periphery of the sleeve 24. A fundamental or basis arrangement of the solenoid 22 is substantially similar to the conventional arrangement.

A valve shaft 31 extending through the anvil 23 is associated with the forward end of the plunger 25. Arranged at a forward end of the valve shaft 31 is a valve mechanism in which a main valve element 32, an auxiliary valve element 33, a spring 34 and the like are assembled together as shown in FIGS. 3 and 4.

FIG. 3 shows a condition under which the valve is open. The solenoid 27 is not energized so that the solenoid 27 is brought to an OFF condition. Under this condition, the main valve element 32 is pulled downwardly in FIG. 3 by a tension force of the spring 34. FIG. 4 shows a condition under which the valve is closed. The solenoid 27 is energized so that the solenoid 27 is brought to an ON condition. Under this condition, the plunger 25 is pushed upwardly in FIG. 4 against the tension force of the spring 34 by the solenoid 27. Normally, the valve is brought to a condition under which the valve is open, that is, the solenoid 27 is brought to the OFF condition. At any abnormality and the like, the solenoid 27 is brought to the ON condition so that the valve is closed. By doing so, an attempt is made to save a consumption electric power. The auxiliary valve element 33 is open before the main valve element 32 is open. A pressure difference across the main valve element 32 is reduced whereby it is made easy to open the main valve element 32.

A nozzle 37 is fixedly arranged on the inside of the frame 20 through nozzle support means 36 so as to be opposed to the main valve element 32.

The nozzle support means 36 is made of a resin compact or the like, and is provided with a ring-like lower support annulus 38 (refer to FIG. 6), three (3) spacers 39 integrally extending from a forward end of the support annulus 38, a latching projection 39a formed on the inside of a forward end of each of the spacers 39, and a pair of fixing bosses 40 integrally projecting toward the inside of the support annulus 38.

Each of the fixing bosses 40 is formed with a female threaded portion which is threadedly engaged with a corresponding one of male threaded sections 21a formed respectively on the forward ends of the mounting posts 21 in the solenoid 22, whereby the support annulus 38 is fixedly positioned on the inside of the frame 20. Further, by this mounting arrangement, through-extending ends of the respective posts 21 with respect to the frame 20 are also sealed.

In this connection, the reference numeral 40a denotes an O-ring mounting groove which is formed in the vicinity of an opening of the threaded bore with which a corresponding one of the male threaded sections 21a of the respective mounting posts 21 mounted respectively on the fixing bosses 40 is threadedly engaged. As shown in FIGS. 3 and 4, an O-ring 21b is inserted in each of the O-ring mounting grooves 40a. Thus, mounting seal effects of the posts 21 can be improved.

Figure 5:
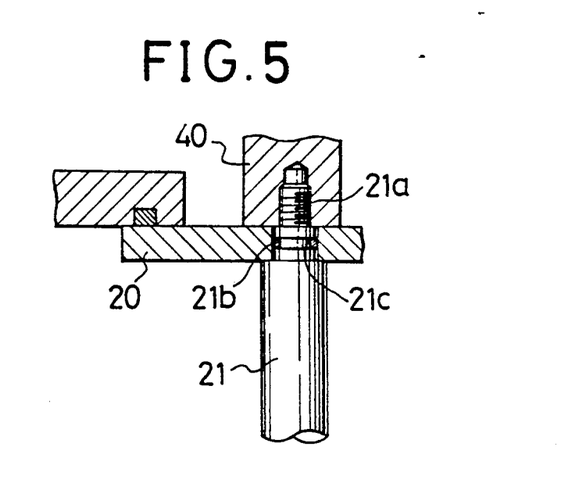
FIG. 5 is a fragmentary cross-sectional view for explanation showing another example of mounting and sealing means of mounting posts to fixing bosses, shown in FIGS. 3 and 4.

Furthermore, the above-described sealing means may be arranged such that, as shown in FIG. 5, a peripheral groove 21c is formed in a frame extending-through portion of each of the posts 21, and an O-ring 21b is inserted in the peripheral groove 21c, to perform sealing.

Referring back to FIGS. 3 and 4, an annular latching groove 37a is formed in the outer periphery of the nozzle 37. Accordingly, as the nozzle 37 is positioned on the inside of the forward end of each of the spacers 39 and is fitted therein elastically or resiliently, each of latching projections 39a is elastically fitted in the latching groove 37a. Thus, the latching projections 39a are fixedly positioned under this condition.

Figure 6:
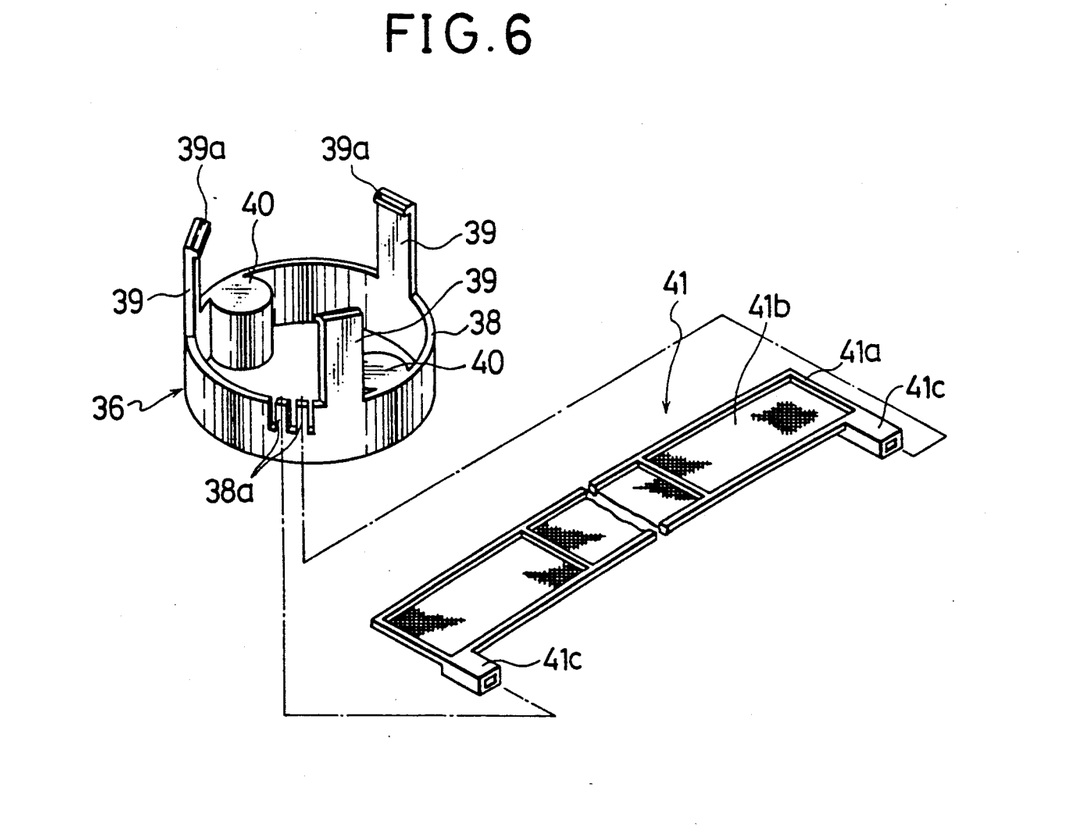
FIG. 6 is a perspective view for explanation of a mounting arrangement of a filter shown in FIGS. 3 and 4.

Moreover, as shown in FIG. 6, a filter 41 is arranged on the peripheries of the respective spacers 39 so as to surround the same in the form of a cylindrical shape. The filter 41 is arranged such that a filter element 41b extends on the inside of a planar-surface-like frame body 41a which is formed into a cylindrical development configuration. A pair of latching bosses 41c integrally extend respectively at lower locations of the both ends of th frame body 41a. The frame body 41a is rounded into a cylindrical configuration, and the bosses 41c are inserted respectively into latching pawls 38a formed at parts of the support annulus 38, whereby the filter 41 is fixedly mounted such that the filter 41 cylindrically surrounds the periphery of each of the spacers 39.

Figure 7:
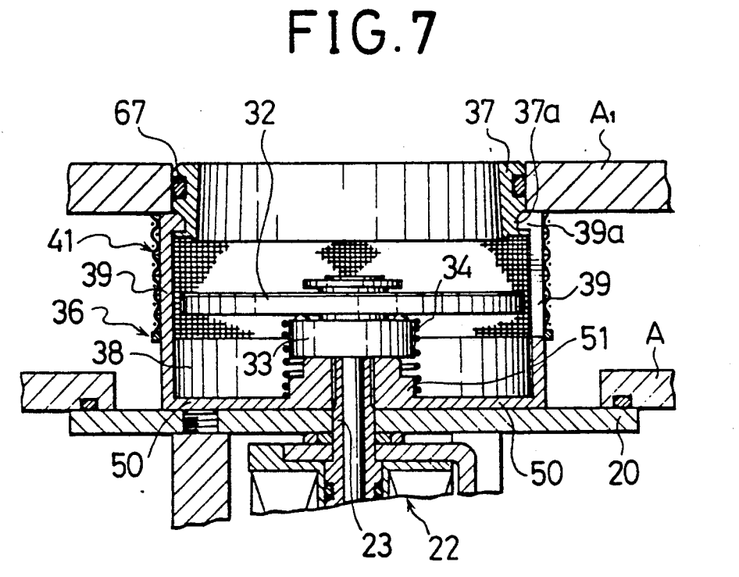
Figure 8:
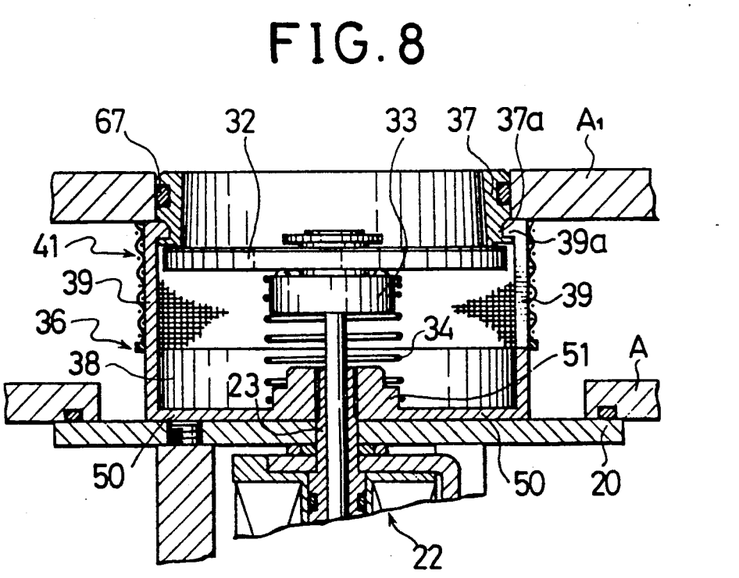

Next, FIGS. 7 and 8 show a second embodiment of the invention.

In this embodiment, a fixing boss 51 is integrally formed at a center of the support annulus 38 through a connecting element 50. The projecting end of the anvil 23 is screwed into a female threaded portion formed in an inner periphery of the boss 51, whereby the support annulus 38 is fixedly mounted on the inside of the frame 20. Other points are similar to those in the aforesaid first embodiment.

According to each of the embodiments constructed as described above, the nozzle support means 36 on which the nozzle 37 is mounted is fixedly mounted on the frame 20 together with the solenoid 22. When the nozzle 37 is inserted into the fitting bore in the partition wall A1 and is incorporated in the valve housing A, a compressive force is applied to the O-ring 67 mounted on the nozzle 37, and a force is applied to the O-ring 67 in the radial direction in the case where the nozzle 37 is mounted while being rotated in the peripheral direction. Since, however, the nozzle 37 is rotatable with respect to the nozzle support means 36, the force in the radial direction does not substantially act upon the O-ring 67. Accordingly, damages and stress and strain can be prevented from being generated in the O-ring 67, making it possible to prolong the service life of the O-ring 67 substantially twice. Further, since the plurality of spacers 39 integrally extends from the support annulus 38 which is fixedly mounted on the in side of the frame 20, dimensional errors and mounting errors do not occur, and the nozzle 37 can fixedly be mounted in one touch. Furthermore, since the support annulus 38 can fixedly be mounted by utilization of the mounting posts 21 of the solenoid 22 and the mounting bosses 40 formed on the support annulus 38, it is possible to secure sealability of the inside and outside of the frame 20.

Moreover, the filter 41 is formed two-dimensionally, and is rounded such that the both ends can fixedly be mounted on the support annulus 38. Thus, it is easy to form the filter 41.

Accordingly, these embodiments have the following advantages. That is, an attempt can be made for miniaturization and simplification, it is possible to reduce the number of parts, and assembling and adjustment or regulation can be simplified. Thus, assembling accuracy is improved.

Figure 9:
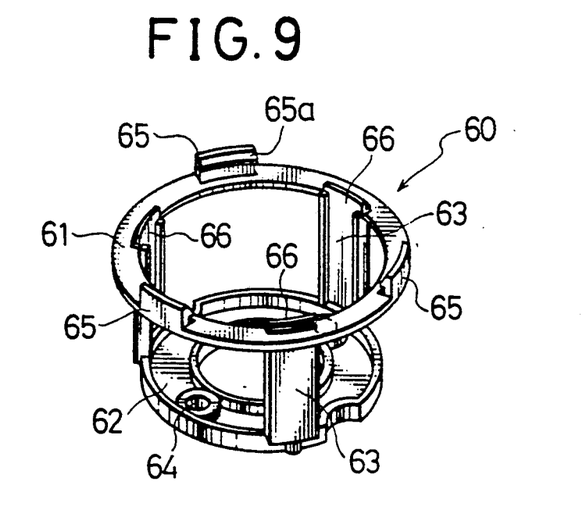
FIG. 9 is a perspective view for explanation showing nozzle support means according to a third embodiment of the invention.
Figure 10:
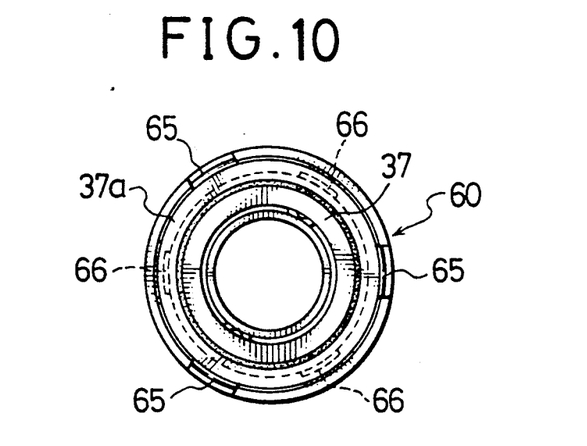
FIG. 10 is a top plan view for explanation showing a condition under which a nozzle is mounted on nozzle support means according to the invention.
Figure 11:
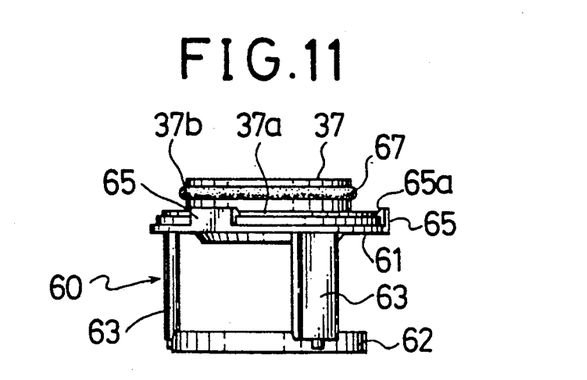
FIG. 11 is a front elevational view for explanation of FIG. 10.

FIGS. 9 through 11 show nozzle support means 60 according to a third embodiment of the invention. In this connection, a valve arrangement is similar to that of the first embodiment of the invention illustrated in FIGS. 3 and 4, and the description of the valve arrangement will be omitted.

The nozzle support means 60 is made of a resin compact or the like. As shown in FIGS. 9 through 11, the nozzle support means 60 is arranged such that a pair of upper and lower support annuluses 61 and 62 are integrally connected to each other concentrically by three (3) spacers 63. The lower support annulus 62 is formed with two (2) mounting bores 64 into which the forward ends of the mounting posts 21 in the solenoid 22 are inserted, respectively. Nuts (not shown) are threadedly engaged respectively with male threaded portions 21a formed at the forward ends of the respective mounting posts 21, whereby the lower support annulus 62 is fixedly positioned on the inside of the frame 20.

Furthermore, three (3) latching pawls 65 project upwardly from the outer periphery of the upper face of the nozzle support annulus 61, and are integrally formed equidistantly in the peripheral direction. Moreover, three (3) inside projections 66 of the support annulus 61 are formed on the inner periphery of the nozzle support annulus 61. The annular latching groove 37a formed on the outer periphery of the nozzle 37 is clamped by the engaging pawls 65, whereby the nozzle 37 is rotatably retained or held on the nozzle support annulus 61. In this connection, the outer periphery of the nozzle 37 is formed with a groove 37b in which an O-ring 67 is mounted. The O-ring 67 is abutted against the inner periphery of the fitting bore in the partition wall A1 so that gas tightness is retained between the inner periphery of the fitting bore in the partition wall A1 and the outer periphery of the nozzle 37.

According to this embodiment, since the nozzle can rotatably be held on the nozzle support annulus, a holding force of the nozzle can considerably be improved as compared with the first and second latching means.

Figure 12:
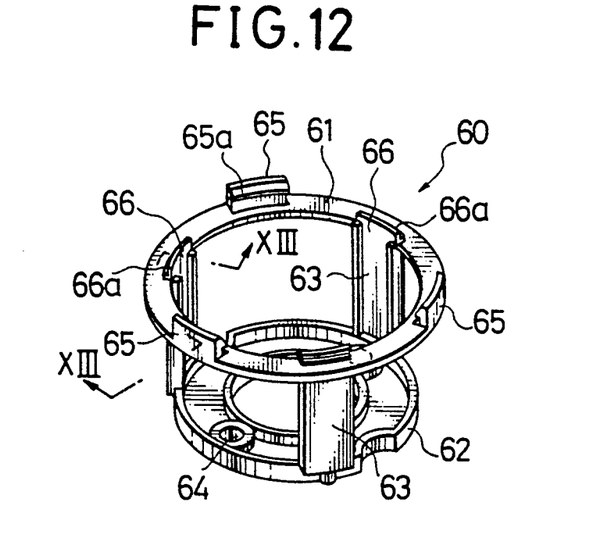
FIG. 12 is a perspective view for explanation showing a modification of the nozzle support means illustrated in FIG. 9.
Figure 13:
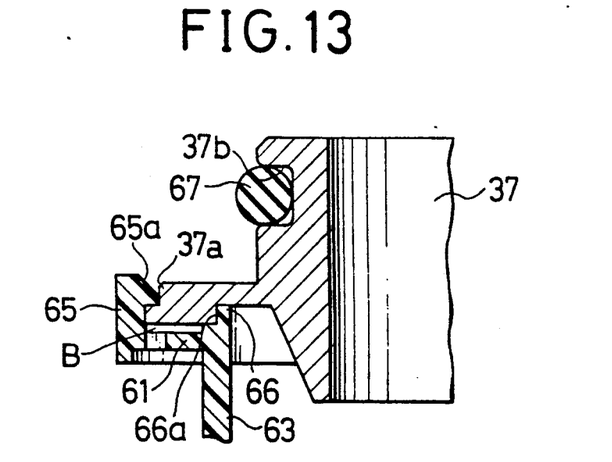
FIG. 13 is a fragmentary cross-sectional view for explanation, taken along the line XIII—XIII in FIG. 12.

In this connection, FIGS. 12 and 13 show a modification of the aforementioned support means 60 illustrated in FIGS. 9 through 11. In the case of this modification, as shown in FIGS. 12 and 13, of projections projecting from the upper face of the upper support annulus 61, each of the projections 66 located on the inner periphery has a proximal end, and a slight step 66a is formed at the outside of the proximal end. The nozzle 37 is supported by the upper faces of the respective steps 66a. Thus, a slight gap B is defined between the lower face of the nozzle 37 and the upper face of the upper support annulus 61. As a result, a contact area between the nozzle 37 and the upper support annulus 61 can be reduced as far as possible, making it possible to further facilitate rotation of the nozzle 37, and making it possible to further improve assembling accuracy of the nozzle. Further, the nozzle 37 is mounted on the steps 66a, whereby portions of the support annulus 61 between the spacers 63 serve as beams each of which has both ends supported. Spring characteristic of the support annulus is efficiently or usefully utilized, whereby it is possible that the annular projection 37a of the nozzle is latched so as to be embraced by the latching pawls 65. Accordingly, it is possible to considerably improve the holding or retaining force of the nozzle 37 by the latching pawls 65.

Moreover, an arrangement of each section illustrated in each of the aforesaid embodiments may be another arrangement without deviation from the spirit of the present invention.

What is claimed is:

1. A nozzle support arrangement in an electromagnetic valve, comprising:
   a frame;
   a solenoid fixedly mounted on the outside of said frame;
   a valve element arranged on the inside of said frame, and driven in advancement and retreat by said solenoid;
   a nozzle arranged on the inside of said frame and arranged so as to be opposed to said valve element; and
   support means by which said nozzle is supported on the inside of said frame, said support means including a plurality of spacer sections fixedly mounted in an upstanding manner on the inside of said frame, and a plurality of latching sections arranged respectively at forward ends of the respective spacer sections and rotatably latching said nozzle.

2. A nozzle support arrangement in an electromagnetic valve, according to claim 1, wherein said support means integrally has a lower support annulus connecting said plurality of spacer sections to each other, said lower support annulus being fixedly mounted on the inside of said frame.

3. A nozzle support arrangement in an electromagnetic valve, according to claim 1, wherein said nozzle has, at an outer periphery thereof, an annular latching projection, wherein said latching sections of said support means have respective latching projections thereof projecting toward the inside of upper portions of the respective spacer sections, and wherein said latching projections of said support means are elastically engaged with said annular latching projection of said nozzle.

4. A nozzle support arrangement in an electromagnetic valve, according to claim 1, wherein said nozzle has, at an outer periphery thereof, an annular latching projection, and wherein said latching sections of said support means include a nozzle support annulus fixedly mounted on upper portions of the respective spacer sections, and a plurality of latching pawls extending from an upper face of said support annulus and engaged with said annular latching projection of said nozzle.

5. A nozzle support arrangement in an electromagnetic valve, according to claim 4, wherein said latching sections of said support means include nozzle receiving sections arranged respectively at spacer-section upstanding locations on an upper face of said nozzle support annulus, and wherein said latching pawls are mounted on said support annulus at respective locations between said spacer sections.

6. A nozzle support arrangement in an electromagnetic valve, according to any one of claims 1 through 3, wherein a filter is arranged on an outer periphery of said plurality of spacer sections.

* * * * *